United States Patent
Azin et al.

(10) Patent No.: US 9,977,755 B2
(45) Date of Patent: May 22, 2018

(54) MOBILE DEVICE WITH MULTIPLE COMMUNICATION CAPABILITIES

(71) Applicant: QUALCOMM Incorporated, San Diego, CA (US)

(72) Inventors: Meysam Azin, San Diego, CA (US); Vijayakumar Dhanasekaran, San Diego, CA (US); Hui-ya Liao Nelson, San Diego, CA (US); Bengt Stefan Gustavsson, San Diego, CA (US); Peter Jivan Shah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 15/080,166

(22) Filed: Mar. 24, 2016

(65) Prior Publication Data

US 2017/0277645 A1    Sep. 28, 2017

(51) Int. Cl.
| | |
|---|---|
| *H04M 1/00* | (2006.01) |
| *H04B 1/38* | (2015.01) |
| *G06F 13/40* | (2006.01) |
| *H04M 1/02* | (2006.01) |

(52) U.S. Cl.
CPC ...... *G06F 13/4022* (2013.01); *G06F 13/4068* (2013.01); *H04M 1/0202* (2013.01)

(58) Field of Classification Search
CPC ....... H04R 1/1041; H04R 1/1083; H04R 5/04
USPC ................................... 455/550.1, 557, 575.2
See application file for complete search history.

(56) References Cited

U.S. PATENT DOCUMENTS

| | | | |
|---|---|---|---|
| 8,565,842 B2 | 10/2013 | Zhu et al. | |
| 8,798,691 B2 | 8/2014 | Zhu et al. | |
| 2006/0223570 A1* | 10/2006 | Zhu | H04B 1/3833 |
| | | | 455/550.1 |
| 2012/0308041 A1* | 12/2012 | Birch | H03K 17/56 |
| | | | 381/94.1 |

(Continued)

FOREIGN PATENT DOCUMENTS

| | | |
|---|---|---|
| EP | 2632175 A1 | 8/2013 |
| WO | 2012083252 A2 | 6/2012 |
| WO | 2013152332 A1 | 10/2013 |

OTHER PUBLICATIONS

Chen X.L., et al., "Analysis and Design of Mobile Device Antenna-Speaker Integration for Optimum Over-the-Air Performance," IEEE Antennas and Propagation Magazine, Feb. 2015, vol. 57 (1), pp. 97-109.

(Continued)

*Primary Examiner* — Simon Nguyen
(74) *Attorney, Agent, or Firm* — Procopio, Cory, Hargreaves & Savitch LLP

(57) ABSTRACT

An interface unit of a mobile device coupled to an auxiliary device, the interface unit including: a first plurality of switches configured for power delivery to the auxiliary device; at least one isolation unit coupled to the first plurality of switches, the at least one isolation unit configured to isolate the multiple signals and to prevent disruption of data communication between the mobile device and the auxiliary device; and a second plurality of switches configured for the data communication between the mobile device and the auxiliary device, the second plurality of switches configured to bypass the at least one isolation unit.

30 Claims, 4 Drawing Sheets

(56) References Cited

U.S. PATENT DOCUMENTS

| | | | | |
|---|---|---|---|---|
| 2013/0142350 A1* | 6/2013 | Larsen | ............... | H04R 1/1041 |
| | | | | 381/74 |
| 2014/0093103 A1* | 4/2014 | Breece, III | ............... | H03F 3/68 |
| | | | | 381/120 |
| 2015/0098579 A1* | 4/2015 | Holzmann | ............... | H04R 5/04 |
| | | | | 381/71.6 |
| 2015/0296286 A1* | 10/2015 | Prentice | ............... | H04R 1/1083 |
| | | | | 381/71.6 |
| 2016/0094361 A1* | 3/2016 | Su | ............... | H04L 45/02 |
| | | | | 370/257 |
| 2016/0100243 A1* | 4/2016 | Wismar | ............... | H04R 1/1041 |
| | | | | 381/74 |
| 2016/0157008 A1* | 6/2016 | Zhang | ............... | H04R 5/04 |
| | | | | 381/74 |

OTHER PUBLICATIONS

Kang H.D., et al., "Wideband Power Line Isolation using Open Stub Structures," Electronics Letters, Jun. 20, 2013, vol. 49 (13), 2 pages.
Subramani K.S., "Wireless Networking Testbed and Emulator (WiNeTestEr)," Proceedings of the 17th ACM International Conference on Modeling, Analysis and Simulation of Wireless and Mobile Systems, 2014, pp. 51-58.
International Search Report and Written Opinion—PCT/US2017/018201—ISA/EPO—dated May 12, 2017.

* cited by examiner

MOBILE DEVICE WITH MULTIPLE COMMUNICATION CAPABILITIES

BACKGROUND

Field

The present disclosure relates generally to a mobile device with multiple communication capabilities, and more specifically, to an interface unit of the mobile device.

Background

Mobile devices may provide multiple communication capabilities including digital data communication between the mobile device and an auxiliary device coupled to the mobile device. In one example, the auxiliary device may be a headset. The multiple communication capabilities may also include a frequency modulation (FM) radio operation with the connected headset used as an antenna (i.e., a long wire connecting the headset to the mobile device is used as an antenna). Thus, the ground terminal of the headset may be coupled to an FM receiver residing on the mobile device.

A mobile device with an FM receiver may require ferrite beads (FBs) or radio frequency chokes (RFCs) to isolate the FM signal and ensure sensitivity of the FM receiver. However, the presence of the FBs may disrupt the digital data communication between the mobile device and the auxiliary device such as a headset.

SUMMARY

The present disclosure describes various implementations of an interface unit of a mobile device.

In one embodiment, an interface unit of a mobile device coupled to an auxiliary device is disclosed. The interface unit includes: a first plurality of switches configured for power delivery to the auxiliary device; at least one isolation unit coupled to the first plurality of switches, the at least one isolation unit configured to isolate the multiple signals and to prevent disruption of data communication between the mobile device and the auxiliary device; and a second plurality of switches configured for the data communication between the mobile device and the auxiliary device, the second plurality of switches configured to bypass the at least one isolation unit.

In another embodiment, a mobile device coupled to an auxiliary device is disclosed. The mobile device includes: a radio frequency (RF) transceiver configured to communicate with other mobile devices; an audio codec coupled to the RF transceiver; and an interface unit coupled to the audio code, the interface unit comprising: a first plurality of switches configured for power delivery to the auxiliary device; at least one isolation unit coupled to the first plurality of switches; and a second plurality of switches configured for the data communication between the mobile device and the auxiliary device, the second plurality of switches configured to bypass the at least one isolation unit.

In another embodiment, a method for enabling multiple communication capabilities for an interface unit of a mobile device coupled to an auxiliary device is disclosed. The method includes: detecting a type of the auxiliary device coupled to the mobile device; configuring a first plurality of switches coupled to at least one isolation unit based on the detected type, the first plurality of switches configured for power delivery to the auxiliary device; configuring a second plurality of switches configured for the data communication between the mobile device and the auxiliary device based on the detected type, the second plurality of switches configured to bypass the at least one isolation unit.

In another embodiment, a mobile device coupled to an auxiliary device is disclosed. The mobile device includes: means for detecting a type of the auxiliary device coupled to the mobile device; means for configuring a first plurality of switches coupled to at least one isolation unit based on the detected type, the first plurality of switches configured for power delivery to the auxiliary device; mean for configuring a second plurality of switches configured for the data communication between the mobile device and the auxiliary device based on the detected type, the second plurality of switches configured to bypass the at least one isolation unit.

Other features and advantages of the present disclosure should be apparent from the present description which illustrates, by way of example, aspects of the present disclosure.

BRIEF DESCRIPTION OF THE DRAWINGS

The details of the present disclosure, both as to its structure and operation, may be gleaned in part by study of the appended further drawings, in which like reference numerals refer to like parts, and in which.

DETAILED DESCRIPTION

As explained above, the presence of the ferrite beads (FBs) disrupts the digital data communication between the mobile device and the auxiliary device coupled to the mobile device. Thus, a solution for providing uninterrupted digital data communication between the mobile device and the auxiliary device in the presence of disturbing units such as ferrite beads (FBs) is needed. One solution is to bypass the FBs using switches that provide relatively low ON resistance (e.g., less than 1Ω to keep the voltage drop low) and also provide relatively low OFF capacitance (e.g., less than 20 pF) to maintain the FM sensitivity. However, switches with such tight specifications are relatively expensive. Accordingly, a new design of the mobile device includes two sets of relatively low cost switches, with one set for data communication which bypasses the FBs and another set for power delivery.

After reading this description it will become apparent how to implement the present disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Figure 1:
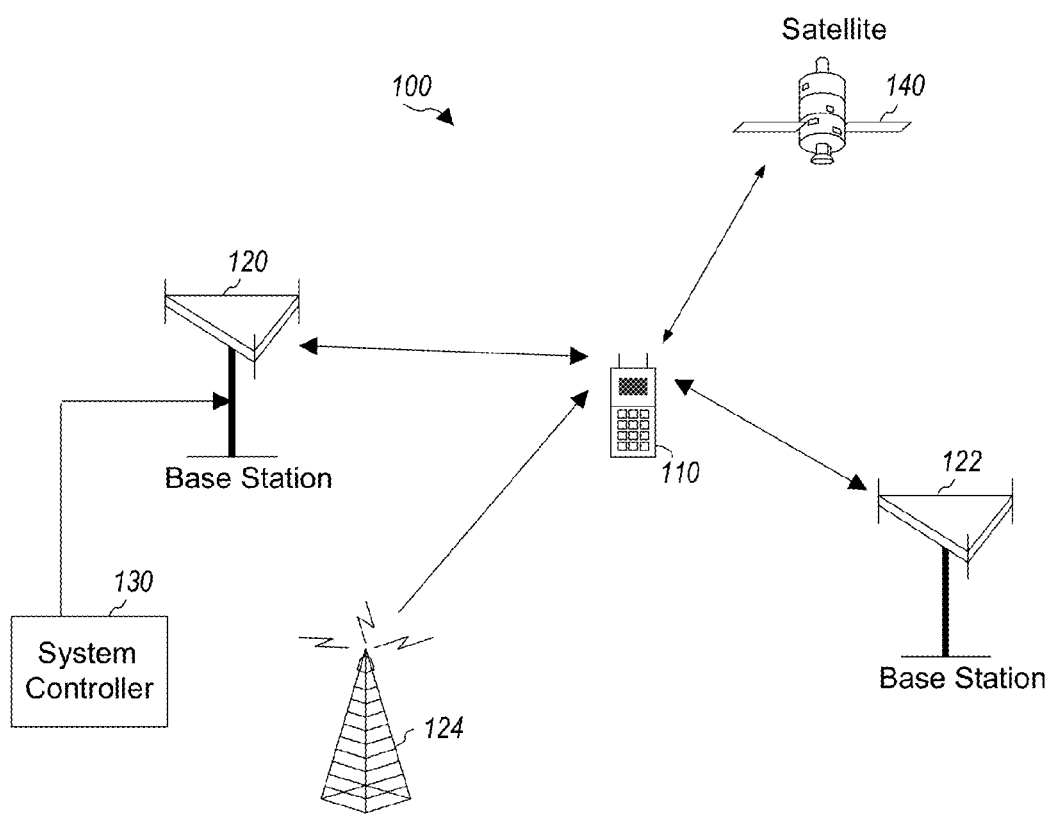
FIG. 1 is an exemplary wireless device communicating with a wireless communication system.

FIG. 1 is an exemplary wireless device 110 communicating with a wireless communication system 100. Wireless communication system 100 may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1X, Evolution-Data Optimized (EVDO), Time Division Synchronous CDMA (TD-SCDMA), or some other version of CDMA. For simplicity, FIG. 1 shows wireless communication system 100 including two base stations 120 and 122 and one system controller 130. In general, a wireless system may include any number of base stations and any set of network entities.

Wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. Wireless device 110 may communicate with wireless system 100. Wireless device 110 may also receive signals from broadcast stations (e.g., broadcast station 124), signals from satellites (e.g., satellite 140) in one or more global navigation satellite systems (GNSS), etc. Wireless device 110 may support one or more radio technologies for wireless communication including LTE, WCDMA, CDMA 1X, EVDO, TD-SCDMA, GSM, 802.11, etc.

Figure 2:
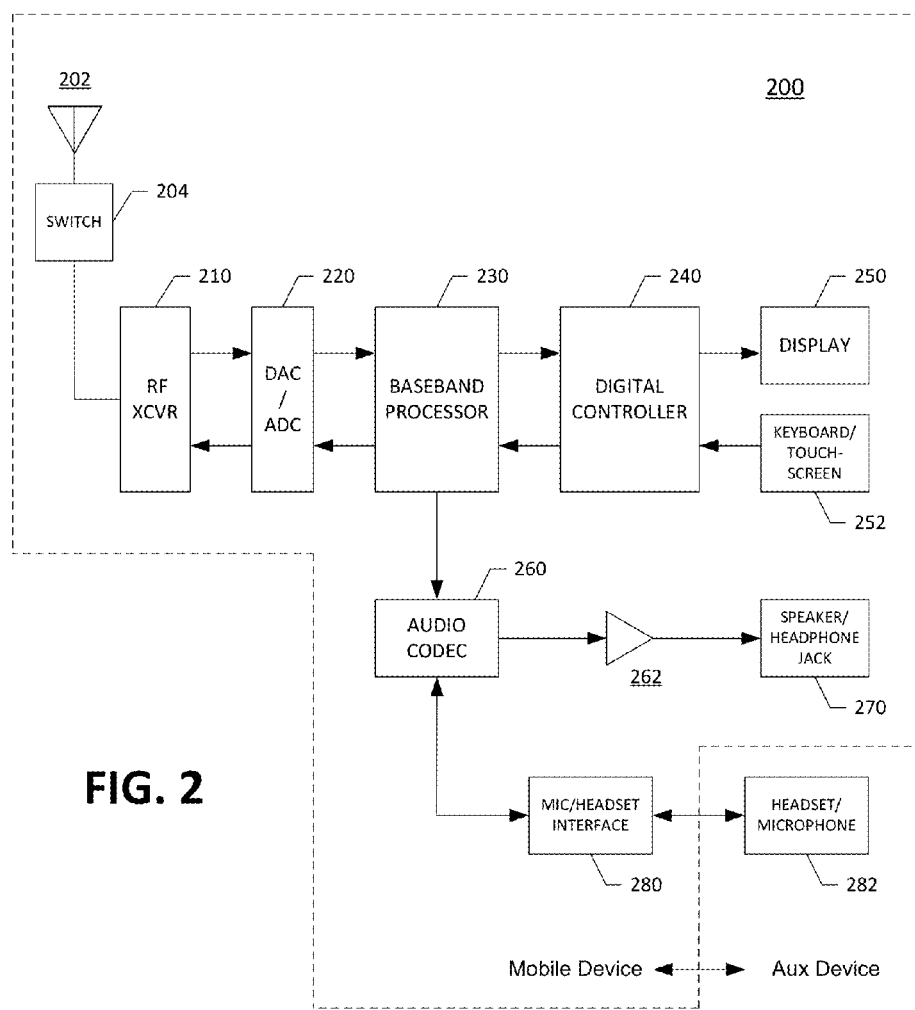
FIG. 2 is a functional block diagram of an exemplary design of a wireless device that is one embodiment of the wireless device shown in FIG. 1.

FIG. 2 is a functional block diagram of an exemplary design of a wireless device 200 that is one embodiment of the wireless device 110 of FIG. 1. In this exemplary design, the wireless device 200 includes an antenna 202, a switch 204, a radio frequency (RF) transceiver unit 210, a digital-to-analog converter (DAC)/analog-to-digital converter (ADC) 220, a baseband processor 230, a digital controller 240, a display unit 250, and a keyboard/touch screen 252. The wireless device 200 may also include an audio codec 260 having an audio amplifier, an external amplifier 262, and a speaker/headphone jack 270. In one embodiment, the speaker/headphone jack 270 includes a 3.5 mm audio jack. In other embodiments, the speaker/headphone jack 270 includes a USB port, mini USB port, micro USB port, USB type-C port, Lightning port, or any other type of interface.

The wireless device 200 may also include a microphone/headset interface 280 which interfaces with an auxiliary device such as a headset/microphone 282. The wireless device 200 may further include other units (not shown) including a universal serial bus unit (USB), a camera, a wireless network interface unit, a subscriber identity module (SIM) card, a battery, memory unit, etc. It should be noted that not all blocks of the wireless device in FIG. 2 are necessary. For example, the DAC/ADC 220 can be subsumed within the baseband processor 230. In another example, the external amplifier 262 may be removed from some configurations.

The RF transceiver unit 210 includes two circuits, a transmitter and a receiver. A wireless device 200 uses the transmitter and the receiver to communicate with other wireless devices. The transmitter transmits radio signals and the receiver receives the radio signals. The transmitter includes, among other units, an RF up converter that converts modulated baseband signal (I and Q) either at zero Intermediate frequency (IF) or some IF to RF frequency. The receiver includes, among other units, an RF down converter that converts RF signal to baseband signal (I and Q). The basic component used for frequency conversion is an RF mixer.

The antenna 202 is a metallic object which converts electro-magnetic signal to electric signal and vice versa. Exemplary antennas in the wireless device are of various types such as helix type, planar inverted type, whip or patch type. Micro-strip based patch type of antennas are often used in mobile devices/phones due to its size, easy integration on the PCB, and multi-frequency band of operation. Since only one antenna may be used for both transmit (Tx) and receive (Rx) paths at different times, a Tx/Rx switch 204 may be used to connect both the Tx path and the Rx path with the antenna 202 at different times. For a frequency division duplex (FDD) system, a diplexer may be used in place of the switch which acts as filter to separate various frequency bands.

The DAC/ADC 220 may be used to convert the analog speech signal to the digital signal and vice versa in the wireless device 200. In the Tx path, the converted digital signal is sent to the speech coder such as an audio codec. The types of ADCs include sigma delta, flash, dual slope, and successive approximation. In the Rx path, the automatic gain control (AGC) and the automatic frequency control (AFC) may be used to control gain and frequency. The AGC controls proper maintenance of the DAC by keeping the signal within the dynamic range of the DAC. The AFC controls receiver performance by maintaining the frequency error within a limit.

The baseband processor 230 may convert voice/data to I/Q baseband signal. The baseband processor 230 is sometimes referred to as a physical layer (or Layer 1). The baseband processor 230 may add redundant bits to enable error detection (e.g., using cyclic redundancy check (CRC)) and error correction using forward error correction techniques (e.g., a convolutional encoder (used in the Tx path) and a Viterbi decoder (used in the Rx path). The baseband processor 230 may also perform power management and distribution functions.

The audio codec 260 may be used to compress and decompress the signals to match the data rate to the frame. The audio codec 260 may convert the speech signal at 8 KHz sampling rate to 13 kilobits per second (kbps) rate for a full rate speech traffic channel. The audio codec 260 may couple to the speaker and/or headphone 270 through the external amplifier 262. The audio codec 260 may also couple to the headset/microphone 282 through the microphone/headset interface 280.

The digital controller 240 may control data input and output signals such as switching and driving applications, commands, memory accesses, and executions of programs. The digital controller 240 may also interpret and execute commands to and from the user interface including the display unit 250, the keyboard/touchscreen 252, etc. The digital controller 240 may further manage and execute various applications in an application layer (Layer 7). Applications may include audio, video and image/graphics applications.

Figure 3:
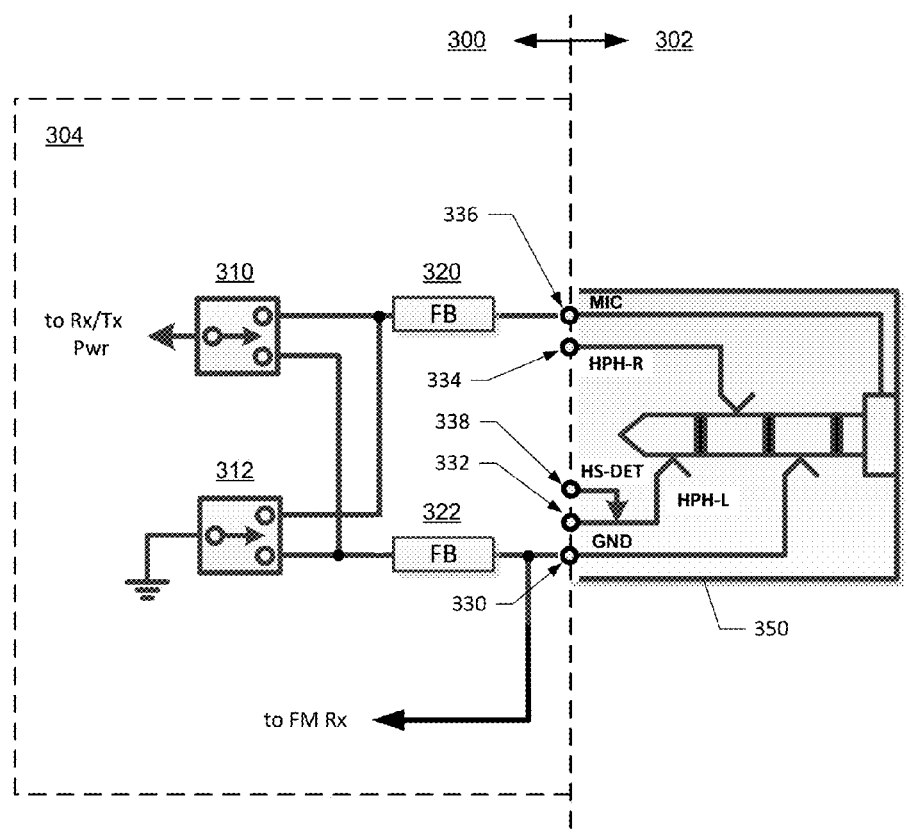
FIG. 3 is a schematic diagram of a mobile device (e.g., a wireless device shown in FIG. 2) with multiple communication capabilities which is coupled to an auxiliary device (e.g., headset and/or microphone shown in FIG. 2)

FIG. 3 is a schematic diagram of a mobile device 300 (e.g., a wireless device 200) with multiple communication capabilities which is coupled to an auxiliary device 302

(e.g., headset and/or microphone 282 shown in FIG. 2) via a connector such as a jack 350. In the illustrated embodiment of FIG. 3, the mobile device 300 provides digital data communication with the headset 302 through the microphone pin (MIC) at node 336 and the ground pin (GND) at node 330. The mobile device 300 also may communicate with an FM radio operation. Further, the mobile device 300 may communicate with the headset 302 using the headphone left (HPH_L) pin at node 332 and/or the headphone right (HPH_R) pin at node 334. The headphone detect (HS-DET) pin at node 338 may be used to detect the presence or type of the headphone connected to the mobile device 300. In the illustrated embodiment of FIG. 3, the HPH_L pin at node 332, HPH_R pin at node 334, and the HS-DET pin at node 338 are not connected for simplicity. However, in one embodiment, those pins 332, 334, 338 can be connected to an audio codec (e.g., audio codec 260 in FIG. 2) so that an audio signal from the mobile device 300 can be sent to a headset (e.g., headset/microphone 282).

The mobile device 300 may include an interface unit 304 (e.g., a microphone/headset interface 280 shown in FIG. 2). The interface unit 304 includes switches 310, 312 to reverse the polarity of the output of the headset 302 to conform to various different standards, such as the United States and European headset standards. One exemplary solution for the switches 310, 312 is to use switches that provide low ON resistance (e.g., less than 1Ω to keep the voltage drop below 0.1V), but relatively high OFF capacitance (e.g., around 100 pF). In one embodiment, the FM receiver (FM Rx) connects to the ground pin (GND) at node 330. However, the FM Rx can be connected to headphone left (HPH_L) pin at node 332 or the headphone right (HPH_R) pin at node 334.

The exemplary mobile device 300 of FIG. 3 is in digital data communication with an FM radio operation with an interface unit 304 that includes ferrite beads (FBs) 320, 322 or radio frequency chokes (RFCs) to isolate the FM signal and maintain sensitivity of the FM receiver in the mobile device 300. However, as stated above, the presence of the FBs 320, 322 may disrupt the digital data communication between the mobile device 300 and the headset 302.

Figure 4:
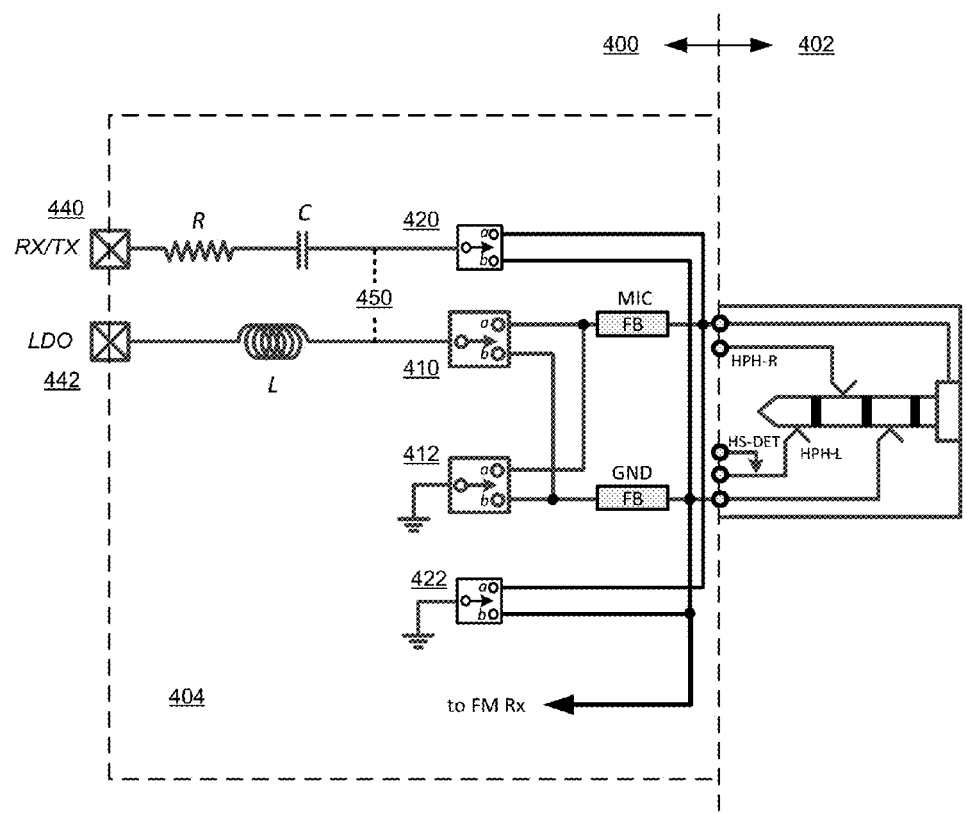
FIG. 4 is a schematic diagram of a mobile device including an interface unit in accordance with one embodiment of the present disclosure.

FIG. 4 is a schematic diagram of a mobile device 400 including an interface unit 404 in accordance with one embodiment of the present disclosure. In the illustrated embodiment of FIG. 4, the interface unit 404 includes two sets of switches 410, 412, 420, 422 which can provide multiple communication capabilities for the mobile device 400.

The first set 410, 412 is a switch set substantially similar to switches 310, 312 in FIG. 3. These switches 410, 412 are configured for power delivery from a low drop-out (LDO) regulator (at node 442), with relatively low ON resistance (e.g., less than 1Ω to keep the voltage drop low), but with relatively high OFF capacitance (e.g., greater than 100 pF).

The second set 420, 422 is a switch set configured for data communication between the receiver/transmitter (RX/TX) of the mobile device 400 (at node 440) and the headset 402. These switches 420, 422 are configured with relatively high ON resistance (e.g., less than 5Ω but greater than 1Ω) and relatively low OFF capacitance (e.g., less than 10 pF) to maintain the sensitivity of the FM receiver. Accordingly, the two set solution may provide a relatively low cost solution to maintaining multiple communication capabilities for the mobile device 400 including digital data communication and FM radio operation.

Data communication node 440 couples to switch 420 through resistor R and capacitor C. The value of resistor R is adjusted to be $R_{TX}-2*R_{SW}$, wherein $R_{TX}$ represents a typical transmission resistance value, while $2*R_{SW}$ represents the ON resistance value of switches 420, 422. Power delivery node 442 couples to switch 410 through inductor L. Typical values for capacitor C may be 1 μF and inductor L may be 22 μH.

Accordingly, the configurations of two sets of switches with different sizes of ON resistances and OFF capacitances enable multiple communication capabilities for the mobile device 400. Further, the operation of switches 410, 412, 420, 422 may be based on the detected type of the connected device (e.g., headset/microphone 282). For example, switches 410, 420 are connected to 'a' output pins and switches 412, 422 are connected to 'b' output pins for one type of device (e.g., a device meeting the United States headset standard), while switches 410, 420 are connected to 'b' output pins and switches 412, 422 are connected to 'a' output pins for another type of device (e.g., a device meeting the European headset standard). Therefore, the polarity of each set of switches is reversed based one the detected type of the connected device to conform to various different standards.

In an exemplary embodiment, inputs of the microphone switches 410, 420 can be optionally shorted together via a shorting connection 450 to combine data going to/from the RX/TX with power from the LDO. In a further embodiment, the switches 410, 412, 420, 422 can be integrated into a single codec chip in the mobile device 400.

Although several embodiments of the present disclosure are described above, many variations of the present disclosure are possible. For example, although the illustrated embodiments of the present disclosure show only two set of switches, additional sets of switches can be added to provide uninterrupted digital data communication between the mobile device and the auxiliary device in the presence of disturbing units such as ferrite beads (FBs). Further, features of the various embodiments may be combined in combinations that differ from those described above. Moreover, for clear and brief description, many descriptions of the systems and methods have been simplified. Many descriptions use terminology and structures of specific standards. However, the disclosed systems and methods are more broadly applicable.

Those of skill will appreciate that the various illustrative blocks and modules described in connection with the embodiments disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the present disclosure. In addition, the grouping of functions within a module, block, or step is for ease of description. Specific functions or steps can be moved from one module or block without departing from the present disclosure.

The various illustrative logical blocks, units, steps, components, and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Further, circuits implementing the embodiments and functional blocks and modules described herein can be realized using various transistor types, logic families, and design methodologies.

The above description of the disclosed embodiments is provided to enable any person skilled in the art to make or use the present disclosure. Various modifications to these embodiments will be readily apparent to those skilled in the art, and the generic principles described herein can be applied to other embodiments without departing from the spirit or scope of the present disclosure. Thus, it is to be understood that the description and drawings presented herein represent presently preferred embodiments of the present disclosure and are therefore representative of the subject matter which is broadly contemplated by the present disclosure. It is further understood that the scope of the present disclosure fully encompasses other embodiments that may become obvious to those skilled in the art and that the scope of the present disclosure is accordingly limited by nothing other than the appended claims.

What is claimed is:

1. An interface unit of a mobile device coupled to an auxiliary device, the interface unit comprising:
   a first plurality of switches configured for power delivery to the auxiliary device;
   at least one isolation unit coupled to the first plurality of switches; and
   a second plurality of switches configured for the data communication between the mobile device and the auxiliary device, the second plurality of switches configured to bypass the at least one isolation unit.

2. The interface unit of claim 1, wherein the second plurality of switches comprises
   a first switch and a second switch, the first switch configured to selectively couple to a first or second pin of a data communication interface and the second switch configured to selectively couple to the other pin of the first and second pins of the data communication interface.

3. The interface unit of claim 2, wherein the selectively coupling of the first and second switches to the first and second pins is based on a detected type of the auxiliary device connected to the data communication interface.

4. The interface unit of claim 2, wherein the first switch is further coupled to a receiver/transmitter (RX/TX) of the mobile device and the second switch is further coupled to ground.

5. The interface unit of claim 4, wherein the first and second switches are further configured to selectively couple the first and second pins to the RX/TX and the ground.

6. The interface unit of claim 1, wherein the at least one isolation unit comprises at least one ferrite bead.

7. The interface unit of claim 1, wherein the at least one isolation unit comprises at least one radio frequency choke.

8. The interface unit of claim 1, wherein the auxiliary device is a headset with a connected antenna for a frequency modulation (FM) receiver built into the mobile device.

9. The interface unit of claim 1, wherein the first plurality of switches are configured to allow a reversal of a polarity of an output of the auxiliary device.

10. The interface unit of claim 1, wherein the first plurality of switches provides an ON resistance that is less than $1\Omega$ and an OFF capacitance around 100 pF.

11. The interface unit of claim 1, wherein the second plurality of switches provide an ON resistance between $1\Omega$ and $5\Omega$ and an OFF capacitance that is less than 10 pF.

12. The interface unit of claim 1, further comprising
    first and second data communication nodes, the first data communication node coupled to the first plurality of switches, and the second data communication node coupled to the second plurality of switches.

13. The interface unit of claim 12, wherein the first data communication node couples to a low drop-out (LDO) regulator of the mobile device.

14. The interface unit of claim 12, wherein the second data communication node couples to a receiver/transmitter (RX/TX) of the mobile device.

15. The interface unit of claim 12, further comprising
    an inductor coupled between the first data communication node and the first plurality of switches.

16. The interface unit of claim 12, further comprising
    a resistor and a capacitor coupled between the second data communication node and the second plurality of switches.

17. The interface unit of claim 16, wherein the value of the resistor is adjusted to be $R_{TX}=2*R_{SW}$, wherein $R_{TX}$ represents a typical transmission resistance value and $2*R_{SW}$ represents an ON resistance value of the second plurality of switches.

18. The interface unit of claim 1, wherein the first plurality of switches and the second plurality of switches are shorted together.

19. The interface unit of claim 1, wherein the first plurality of switches and the second plurality of switches are integrated into a single codec chip in the mobile device.

20. A mobile device coupled to an auxiliary device, the mobile device comprising:
    a radio frequency (RF) transceiver configured to communicate with other mobile devices;
    an audio codec coupled to the RF transceiver; and
    an interface unit coupled to the audio code, the interface unit comprising:
       a first plurality of switches configured for power delivery to the auxiliary device;
       at least one isolation unit coupled to the first plurality of switches; and
       a second plurality of switches configured for the data communication between the mobile device and the auxiliary device, the second plurality of switches configured to bypass the at least one isolation unit.

21. The mobile device of claim 20, wherein the at least one isolation unit comprises at least one ferrite bead.

22. The mobile device of claim 21, wherein the first plurality of switches is configured such that in one configuration the first plurality of switches is coupled to the output of the auxiliary device through the at least ferrite bead, while in another configuration the first plurality of switches is cross-coupled to the output of the auxiliary device through the at least ferrite bead.

23. The mobile device of claim 20, wherein the interface unit further comprises
    first and second data communication nodes, the first data communication node coupled to the first plurality of switches, and the second data communication node coupled to the second plurality of switches.

24. The mobile device of claim 23, further comprising an inductor coupled between the first data communication node and the first plurality of switches.

25. The mobile device of claim 23, further comprising a resistor and a capacitor coupled between the second data communication node and the second plurality of switches.

26. A method for enabling multiple communication capabilities for an interface unit of a mobile device coupled to an auxiliary device, the method comprising:
- detecting a type of the auxiliary device coupled to the mobile device;
- configuring a first plurality of switches coupled to at least one isolation unit based on the detected type, the first plurality of switches configured for power delivery to the auxiliary device;
- configuring a second plurality of switches configured for the data communication between the mobile device and the auxiliary device based on the detected type, the second plurality of switches configured to bypass the at least one isolation unit.

27. The method of claim 26, wherein the configuring of the second plurality of switches comprises:
- selectively coupling a first switch of the second plurality of switches to either a first or second data communication node coupled to the auxiliary device; and
- selectively coupling a second switch of the second plurality of switches to the other data communication node of the first and second data communication nodes.

28. The method of claim 27, wherein the first switch is further coupled to a receiver/transmitter (RX/TX) of the mobile device and the second switch is further coupled to ground.

29. A mobile device coupled to an auxiliary device, the mobile device comprising:
- means for detecting a type of the auxiliary device coupled to the mobile device;
- means for configuring a first plurality of switches coupled to at least one isolation unit based on the detected type, the first plurality of switches configured for power delivery to the auxiliary device;
- mean for configuring a second plurality of switches configured for the data communication between the mobile device and the auxiliary device based on the detected type, the second plurality of switches configured to bypass the at least one isolation unit.

30. The mobile device of claim 29, wherein the means for configuring of the second plurality of switches comprises:
- means for selectively coupling a first switch of the second plurality of switches to either a first or second data communication node coupled to the auxiliary device; and
- means for selectively coupling a second switch of the second plurality of switches to the other data communication node of the first and second data communication nodes.

* * * * *